(12) United States Patent
Mori

(10) Patent No.: US 8,553,263 B2
(45) Date of Patent: Oct. 8, 2013

(54) INFORMATION PROCESSING APPARATUS, CONTROL METHOD FOR INFORMATION PROCESSING APPARATUS, AND STORAGE MEDIUM

(75) Inventor: Namihiro Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 467 days.

(21) Appl. No.: 12/919,210

(22) PCT Filed: Jul. 15, 2010

(86) PCT No.: PCT/JP2010/004596
§ 371 (c)(1),
(2), (4) Date: Aug. 24, 2010

(87) PCT Pub. No.: WO2011/016187
PCT Pub. Date: Feb. 10, 2011

(65) Prior Publication Data
US 2011/0170132 A1    Jul. 14, 2011

(30) Foreign Application Priority Data

Aug. 7, 2009 (JP) .................................. 2009-184119

(51) Int. Cl.
*G06F 3/14* (2006.01)
*G06K 15/00* (2006.01)
*G06K 15/12* (2006.01)
*H04N 1/60* (2006.01)
*B41J 5/30* (2006.01)

(52) U.S. Cl.
USPC ......... 358/1.15; 358/1.14; 358/1.17; 358/1.9; 400/62

(58) Field of Classification Search
None
See application file for complete search history.

(56) References Cited

U.S. PATENT DOCUMENTS 6,084,688 A * 7/2000 Stumbo et al. ............... 358/1.17
6,817,791 B2 * 11/2004 Klassen ........................ 400/62
2002/0186384 A1 * 12/2002 Winston et al. .............. 358/1.5
2003/0142350 A1 * 7/2003 Carroll ......................... 358/1.15
2008/0180725 A1    7/2008 Levin

FOREIGN PATENT DOCUMENTS

| EP | 1465053 | 10/2004 |
| JP | 2004-348194 A | 12/2004 |
| JP | 2005128878 | 5/2005 |

OTHER PUBLICATIONS

International Preliminary Report on Patentability dated Feb. 7, 2012 issued during prosecution of related PCT application No. PCT/JP2010/004596. (Note: References previously cited in IDS dated Feb. 9, 2011).

* cited by examiner

*Primary Examiner* — Twyler Haskins
*Assistant Examiner* — Henok Shiferaw
(74) *Attorney, Agent, or Firm* — Fitzpatrick, Cella, Harper & Scinto

(57) ABSTRACT

An information processing apparatus processes a print job which includes electronic document data containing a shared object to be used wholly in the print job, a non-shared object to be used in part of the print job, and position information on each object, and a job ticket indicating print setting information associated with the electronic document data. The apparatus determines a dividing unit for the electronic document data, based on print attribute information contained in the electronic document data and the print setting information in the job ticket associated with the print attribute information, generates, according to the determined dividing unit, multiple electronic document data items each containing the shared object and the non-shared object associated with the dividing unit, but not including non-shared object unassociated with the dividing unit, and sequentially transmits the generated divided multiple electronic document data items to a printer.

18 Claims, 13 Drawing Sheets

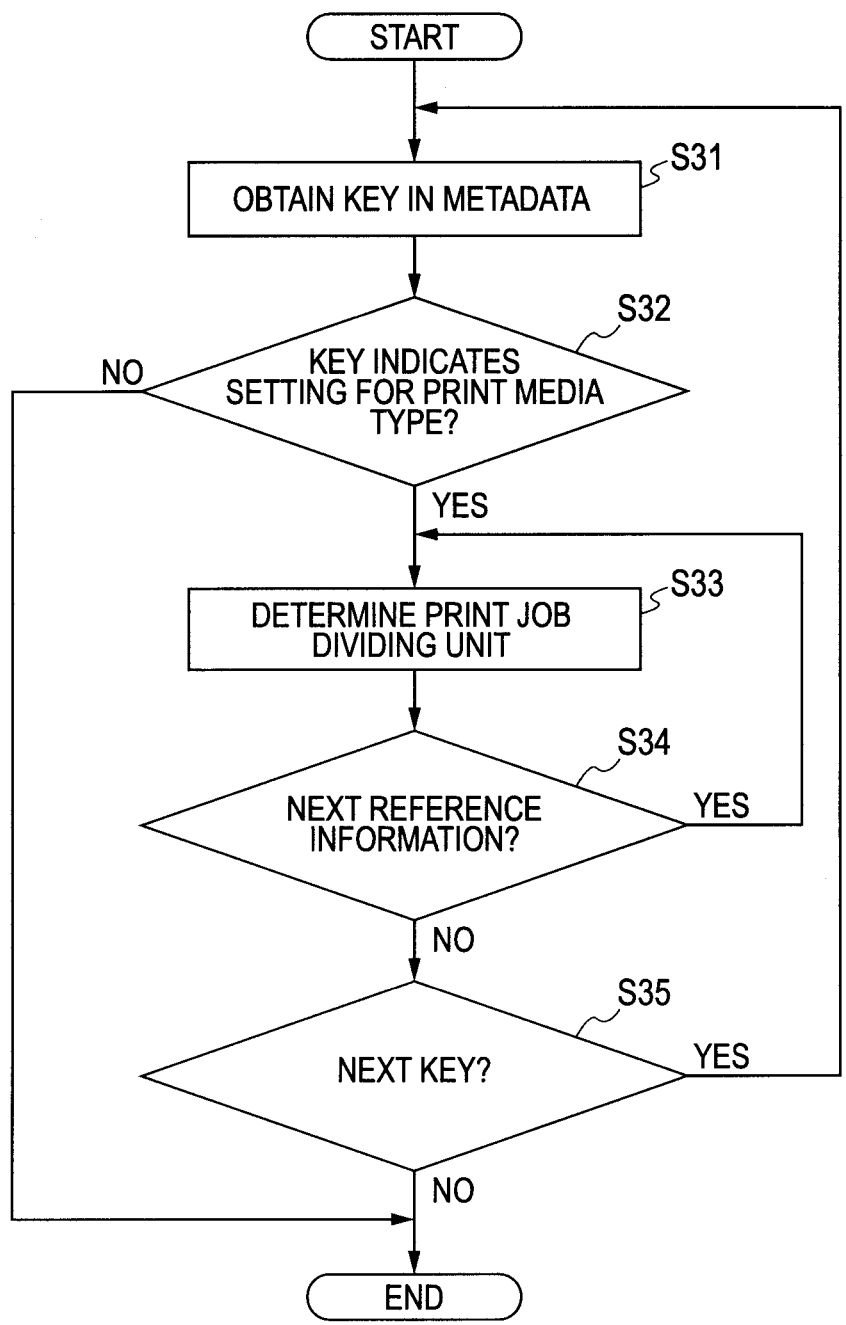

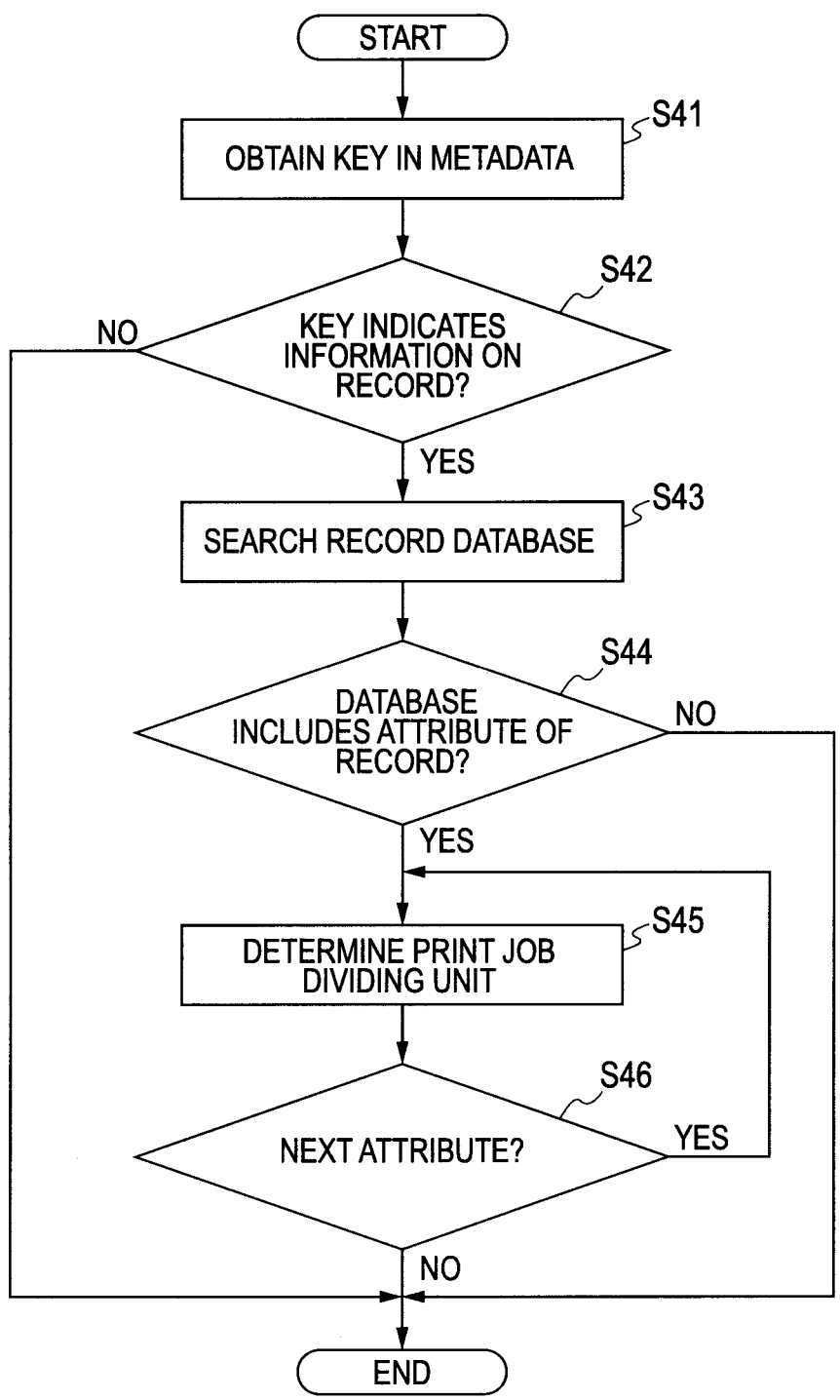

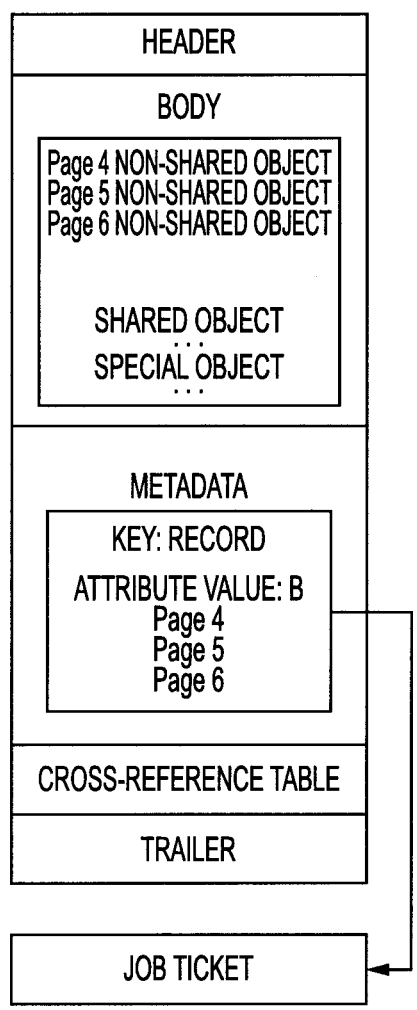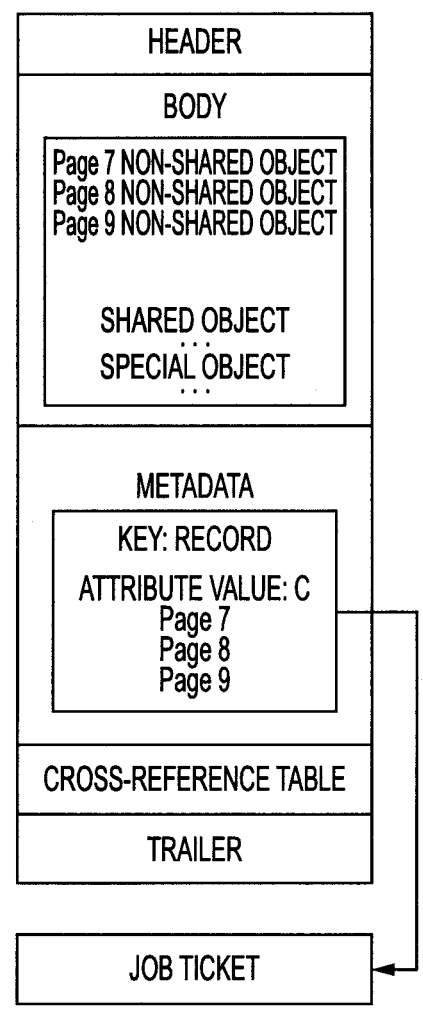
FIG. 9C
FIG. 9D

INFORMATION PROCESSING APPARATUS, CONTROL METHOD FOR INFORMATION PROCESSING APPARATUS, AND STORAGE MEDIUM

This application is a National Stage application under 35 U.S.C. §371 of International Application No. PCT/JP2010/004596, filed on Jul. 15, 2010, which claims priority to Japanese Application No. 2009-184119, filed on Aug. 7, 2009, the contents of each of the foregoing applications being incorporated by reference herein.

TECHNICAL FIELD

The present invention relates to an information processing apparatus for processing electronic document data, a control method for the information processing apparatus, and a storage medium.

BACKGROUND ART

There has been proposed a portable document format (PDF) developed by Adobe Systems to create PDF data, which has become publicly known as an electronic document. The PDF format is a format in which a structural description necessary for interpreting the structure of data to be printed is provided to the end of the electronic document. Accordingly, when interpreting a PDF file, the PDF file needs to be downloaded to the end so that the structural description may be referred to. In a case of using a PDF file in fields of variable data printing (VDP) and transaction printing, where an immense amount of records are processed, there may be conceivable a method of dividing the PDF file. According to the method, the divided PDF files are sequentially transferred to a printer, to thereby perform transmission of the file and outputting (printing) of the file in parallel with each other.

Japanese Patent Application Laid-Open No. 2004-348194 proposes an electronic document printing system. According to the system, PDF data to be printed is divided into multiple data blocks. The last data block is first transferred to the printer, and then the multiple data blocks are sequentially transferred from the head data block to a printer.

However, the conventional technology merely relates to a technology of dividing data into blocks. No consideration is given to dividing PDF data into print jobs, and hence a printer controller or a printer needs to receive the entire PDF data and expand the data onto a memory before performing processing which relates to print attribute such as imposition. Further, in a case where the print attribute is changed in the middle of the data yet to be divided, effective operation of a print engine has been difficult to attain. The print attribute refers to, for example, a predetermined printing unit of electronic document data and print settings for electronic document data.

Accordingly, the conventional technology is incapable of transmitting electronic document data to a printer by dividing the data adaptably to a printing system environment or a use case. As a result, transmission of the electronic document data to the printer and the outputting of the electronic document data in the printer may not be performed in parallel with each other, and hence the print processing in the printer may not be controlled efficiently.

CITATION LIST

Patent Literature

PTL 1: Japanese Patent Application Laid-Open No. 2004-348194

SUMMARY OF INVENTION

According to an aspect of the present invention, there is provided an information processing apparatus for processing a print job which includes objects to be laid out on a page and has position information on the objects in the print job defined at the end of the print job. The information processing apparatus determines a dividing unit for the print job based on print attribute information contained in the print job, derives the position information on the objects based on the determined dividing unit, generates multiple divided print jobs each including the derived position information, and transmits the generated divided print jobs to a printer. According to the information processing apparatus, transmission of the electronic document data to the printer and outputting of the electronic document data in the printer may be performed in parallel with each other, while performing effective control on print processing in the printer.

According to another aspect of the present invention, the printer may be operated efficiently even in a case where the print attribute is changed in the middle of the print job yet to be divided.

Further objects, configurations, and effects of the present invention will become apparent from the following detailed description with reference to the accompanying drawings.

BRIEF DESCRIPTION OF DRAWINGS

FIG. 6 is a flow chart illustrating another example of the process flow of determining a print job dividing unit.

FIG. 8 is a flow chart illustrating a further example of the process flow of determining a print job dividing unit.

FIG. 9C is a diagram illustrating an example of a print job according to the process flow of FIG. 8.

FIG. 9D is a diagram illustrating an example of a print job according to the process flow of FIG. 8.

DESCRIPTION OF EMBODIMENTS

Figure 1A:
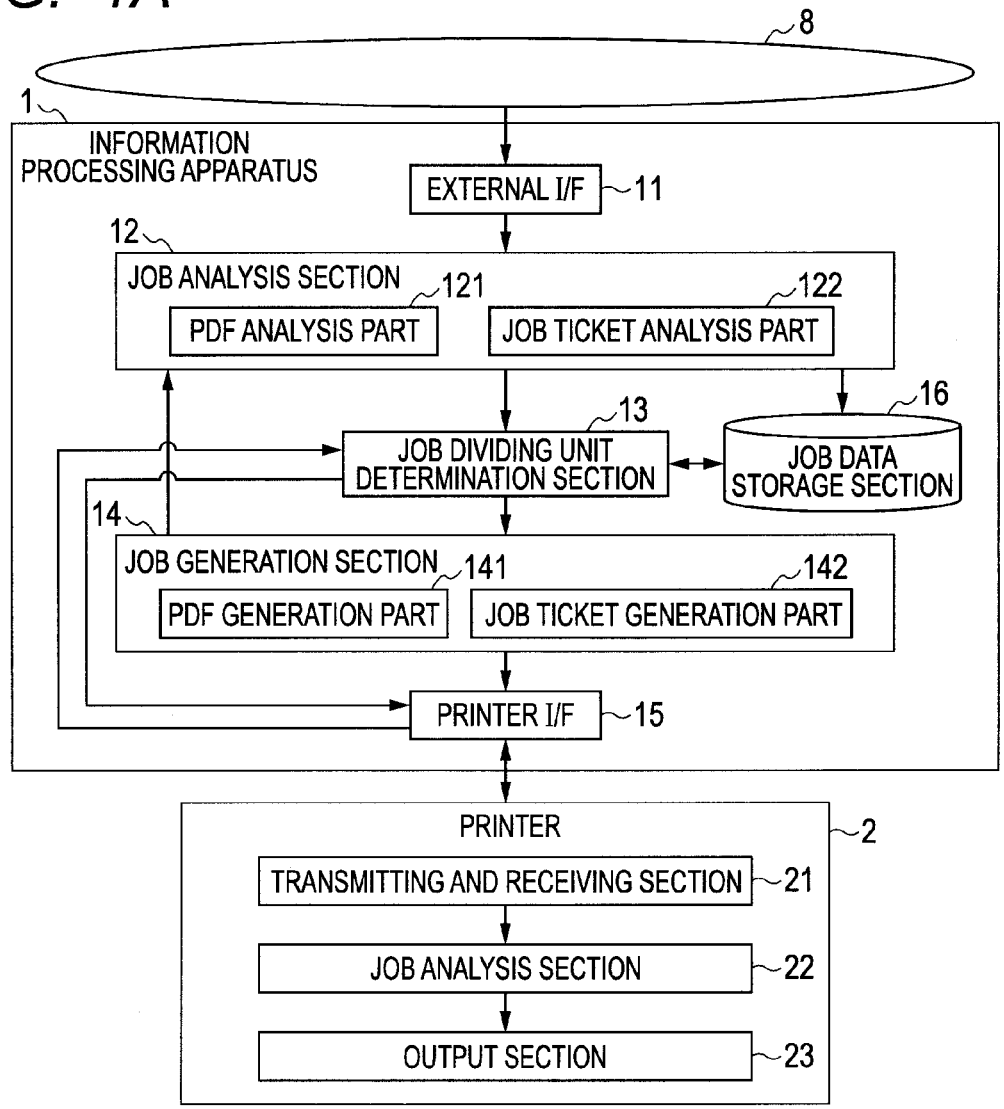
FIG. 1A is a diagram illustrating an example of a system configuration according to an embodiment of the present invention.
Figure 1B:
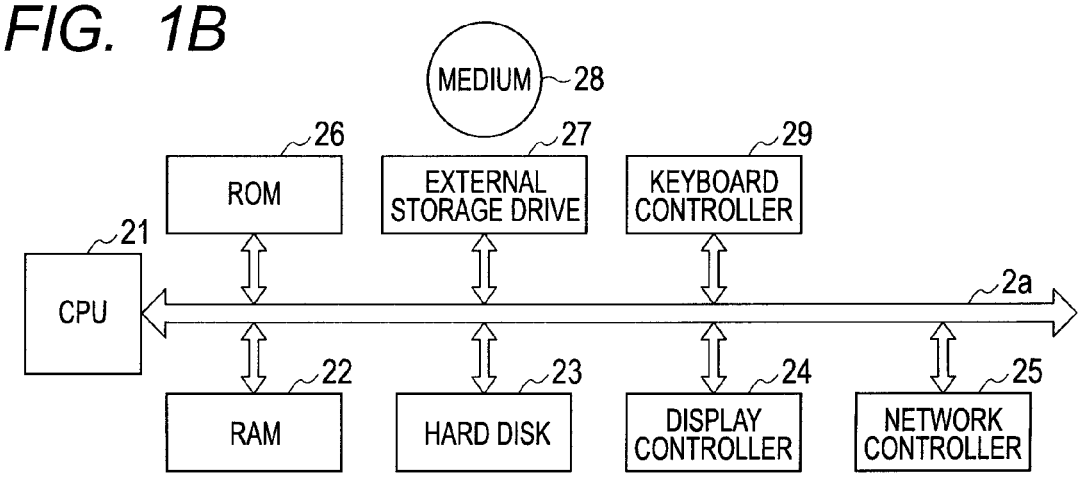
FIG. 1B is a diagram illustrating an example of a system configuration according to an embodiment of the present invention.

FIGS. 1A and 1B are diagrams each illustrating an example of a system configuration according to an embodiment of the present invention. FIG. 1A illustrates a printing system according to the embodiment. The printing system illustrated in FIG. 1A includes an information processing apparatus 1 and a printer 2. The information processing apparatus 1 and the printer 2 are connected to each other via a wired or wireless communication interface.

The information processing apparatus 1 is for processing a print job. Specifically, the information processing apparatus 1 generates a print job which contains electronic document data, and transmits the print job thus generated, to the printer 2. The print job contains the electronic document data and a job ticket which is associated with the electronic document data. More specifically, the print job contains objects to be laid out on a page, and has position information on the objects in the print job defined at the end of the print job. According to the embodiment, the electronic document data refers to, for example, a portable document format (PDF) file. The job ticket refers to a file which includes print setting information indicating print setting to be applied to the electronic document. As described later with reference to FIG. 2A, according to the embodiment, the PDF file contains metadata which constitutes print attribute information indicating print attribute of the print job. Alternatively, the print attribute information may include the metadata and the print setting information contained in the job ticket. The information processing apparatus 1 is configured as, for example, a host computer. The information processing apparatus 1 includes an external interface (I/F) 11, a job analysis section 12, a job dividing unit determination section 13, a job generation section 14, a printer I/F 15, and a job data storage section 16.

The external I/F 11 is an interface for receiving, via a network 8, a print job transmitted to the information processing apparatus 1 from another information processing apparatus different from the information processing apparatus 1. The job analysis section 12 serves as job analysis means for analyzing a print job. The print job may be received via the external I/F 11 or may be generated by the job generation section 14 provided to the information processing apparatus 1. The job analysis section 12 includes a PDF analysis part 121 and a job ticket analysis part 122. The PDF analysis part 121 analyzes the structure of the PDF file contained in the print job. The job ticket analysis part 122 analyzes the job ticket contained in the print job. Specifically, the job ticket analysis part 122 analyzes print setting information indicated by the job ticket which is associated with the PDF file to be analyzed. The job analysis section 12 stores, as job data, file structure information indicating the structure of the PDF file thus analyzed and the print setting information indicated by the job ticket, in the job data storage section 16.

The job dividing unit determination section 13 issues, via the printer I/F 15, an acquisition request asking for printer information with respect to the printer 2, and obtains the printer information from the printer 2 which has responded to the acquisition request for the printer information. The printer information indicates properties of the printer 2. The printer information includes, for example, information on a maximum amount of information to be processed and printed by the printer 2, information on paper feed/receiving trays provided to the printer 2, and information on finisher. In other words, the job dividing unit determination section 13 and the printer I/F 15 serve as printer information acquisition means for obtaining information on a printer (printer 2) which performs print processing on a PDF file.

Further, the job dividing unit determination section 13 extracts job data from the job data storage section 16. The job dividing unit determination section 13 serves as division determination means for determining, based on the printer information thus obtained, whether or not to divide the print job associated with the job data thus extracted. The printer information may include information on a maximum amount of information (for example, a maximum file size) to be processed and printed by the printer 2. Then, the job dividing unit determination section 13 determines whether the amount of information contained in the print job exceeds the maximum amount of information to be processed and printed, and in a case where it is determined that the amount of information contained in the print job exceeds the maximum amount of information to be processed and printed, the job dividing unit determination section 13 may determine to divide the print job.

Further, the job dividing unit determination section 13 serves as job dividing unit determination means for determining, when it is determined to divide the print job, a unit into which the print job is to be divided (hereinafter, the unit is referred to as dividing unit for the print job), based on the print attribute information of the print job. Specifically, the job dividing unit determination section 13 obtains metadata contained in the PDF file with reference to the file structure information in the job data, and determines a dividing unit for the print job based on the metadata. The job dividing unit determination section 13 may determine the dividing unit for the print job, based on the metadata and the print setting information indicated by the job ticket included in the job data.

It should be noted that, as described later, information indicating setting for finishing is an example of the print attribute information. According to another example, the print attribute information relates to setting for print media type, and, based on the information on the setting for print media type, the job dividing unit determination section 13 determines to divide the print job in units of job data items each having the same setting for print media type. According to a further example, the print attribute information relates to setting for record which is a predetermined printing unit in the PDF file, and the job dividing unit determination section 13 determines, based on the information on the setting for record, the printing unit as the dividing unit for the print job.

The job generation section 14 generates a print job according to an operation input made by a user to the information processing apparatus 1, and passes the print job thus generated, to the job analysis section 12. Further, the job generation section 14 serves as job generation means for deriving, based on the print job dividing unit determined by the job dividing unit determination section 13, the position information on the objects contained in the print job, and generating multiple divided print jobs each containing the position information thus derived. Each of the divided print jobs is obtained by dividing the print job, and corresponds to a print job in the dividing unit. The job generation section 14 generates the divided print jobs when the job dividing unit determination section 13 determines to divide the print job. The job generation section 14 passes the divided print jobs thus generated, to the printer I/F 15.

The job generation section 14 includes a PDF generation part 141 and a job ticket generation part 142. The PDF generation part 141 divides the PDF file based on the print job dividing unit and the PDF file contained in the print job, to thereby generate a new PDF file in the dividing unit. Specifically, the PDF generation part 141 obtains, from a PDF file, an object associated with the print job dividing unit, and generates a new PDF file which is associated with the object thus obtained. The job ticket generation part 142 generates a job ticket associated with the PDF file generated by the PDF generation part 141. The new PDF file which is generated by the PDF generation part 141 and in the dividing unit, and the job ticket which is generated by the job ticket generation part 142 and associated with the new PDF file constitute the above-mentioned divided print job. The printer I/F 15 is for mediating communication between the information processing apparatus 1 and the printer 2. The printer I/F 15 obtains, for example, printer information from the printer 2, and passes the printer information thus obtained, to the job dividing unit determination section 13. Further, the printer I/F 15 serves as job transmission means for transmitting, for example, the divided print job generated by the job generation section 14, to the printer 2.

The printer 2 is a device for receiving a print job transmitted from the information processing apparatus 1, and performs print processing on PDF data contained in the print job thus received. The printer 2 includes a transmitting and receiving section 21, a job analysis section 22, and an output section 23. The transmitting and receiving section 21 transmits, in response to an acquisition request for printer information issued by the printer I/F 15 of the information processing apparatus 1, printer information corresponding to the printer 2, to the information processing apparatus 1. Further, the transmitting and receiving section 21 receives a print job from the printer I/F 15 of the information processing apparatus 1.

The job analysis section 22 analyzes the print job received by the transmitting and receiving section 21, and performs rasterization processing on the print job, to thereby generate a page image. The rasterization processing is performed so that the PDF data contained in the print job is turned into a bitmap format. The page image is an image on a page to be printed. Specifically, the job analysis section 22 retrieves an object contained in the PDF data in the print job, and performs the rasterization processing by using the object thus retrieved. The job analysis section 22 recognizes the print setting associated with each page image to be printed, with reference to the print setting information indicated by the job ticket contained in the print job. Then, the job analysis section 22 instructs the output section 23 to print the page image thus generated, according to the print setting associated with the page image. The output section 23 prints out the page image, as instructed by the job analysis section 22. A method of controlling the information processing apparatus 1 according to the embodiment is implemented by each processing section of the information processing apparatus 1, which are described with reference to FIG. 1A. A computer program according to the embodiment has a feature that causes a computer to execute the above-mentioned method of controlling the information processing apparatus 1.

FIG. 1B is a diagram illustrating an example of a hardware configuration of the information processing apparatus 1 illustrated in FIG. 1A. A central processing unit (CPU) 21 executes programs stored in a program area inside a read only memory (ROM) 26. Further, the CPU 21 executes programs such as operating system (OS) and a general-purpose application, which are loaded into a random access memory (RAM) 22 from a hard disk 23. The CPU 21 is connected to each piece of the hardware provided to the information processing apparatus 1, via an internal bus 2a. The RAM 22 serves as a main memory or a work area of the CPU 21. The RAM 22 includes the job data storage section 16 provided to the information processing apparatus 1. The hard disk 23 stores, for example, a boot program, various applications, font data, user files, and electronic manuscript files. Further, print jobs received by the information processing apparatus 1 or print jobs generated by the information processing apparatus 1 are all stored in the hard disk 23. A display controller 24 performs display control for displaying various kinds of information on a display. A network controller 25 performs communication control processing for communicating with another information processing apparatus connected to the network 8. Programs necessary for processing the operation of the information processing apparatus 1 are stored in advance in a program area of the ROM 26. An external storage drive 27 stores, in a medium 28 inserted into the external storage drive 27, an electronic manuscript file and the like. A keyboard controller 29 controls key input from a keyboard and a pointing device.

Figure 2A:
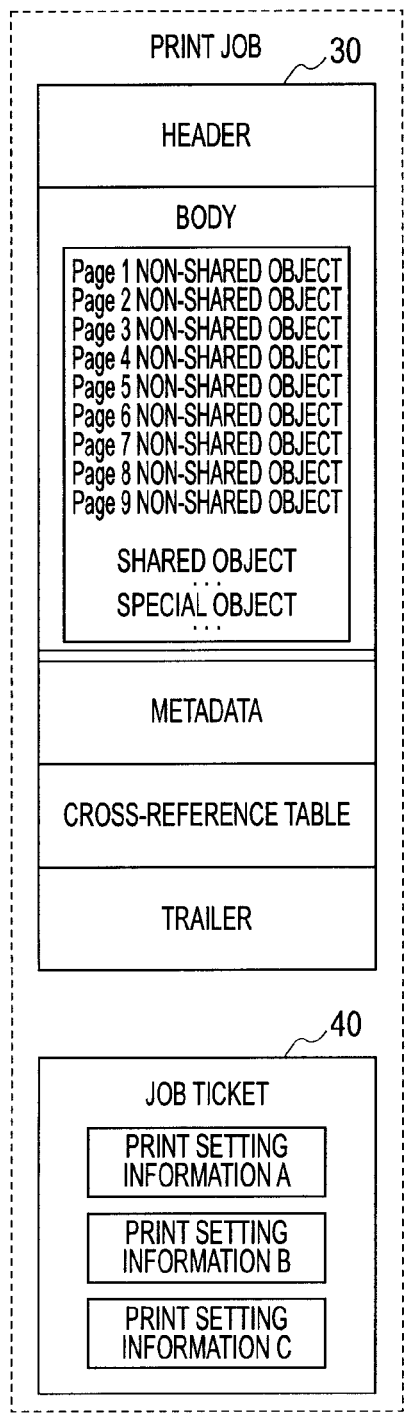
FIG. 2A is a diagram illustrating an example of a PDF file and a job ticket.

FIGS. 2A to 2D are diagrams each illustrating an example of a PDF file and a job ticket contained in a print job. FIG. 2A illustrates a print job to be analyzed by the job analysis section 12 of the information processing apparatus 1. The print job contains a PDF file 30 and a job ticket 40. The PDF file 30 includes a header, a body, metadata, a cross-reference table, and a trailer. The header is information listed in a first row of the PDF file 30. The header includes information such as, for example, a version number of the PDF. The body includes objects representing the contents of a document. The objects relate to information on font, page, and image forming the document. In the example illustrated in FIG. 2A, the body has non-shared objects from Page 1 to Page 9 listed therein. Further, the body has a shared object to be used by all Pages and a special object listed therein.

The metadata is a dictionary object representing a key related to an arbitrary page. The key indicates the print attribute of the print job. In other words, the metadata is print attribute information on the print job. The key has reference information, and the reference information indicates an object associated with the print attribute indicated by the key, in the body. Further, the reference information indicates, for example, the job ticket 40 which contains print setting information associated with the print attribute indicated by the key. When the reference information indicates the job ticket 40, the metadata and the print setting information contained in the job ticket 40 correspond to the print attribute information of the print job. The cross-reference table stores in advance information on correspondence between the objects in the PDF file 30 and positions of the objects. Further, the cross-reference table stores in advance byte offsets (example of the position information) from the top-of-file, for the metadata and for the objects. The cross-reference table may be searched, so that the objects in the PDF file 30 may be randomly accessed. The trailer is information listed to the end of the PDF file 30. The trailer includes information such as, for example, the position information in the cross-reference table, and the reference information to a root object in the PDF file 30. Applications are implemented so as to access the trailer first. The position information of the cross-reference table in the trailer is referred to, and then the cross-reference table is accessed. Then, based on the cross-reference table, the offset of the object is identified, to thereby enable random access to the object.

The job ticket 40 contains print setting information of the print job. The job ticket 40 contains print setting information which is associated with, for example, each print attribute indicated by each key represented by the metadata. In the example illustrated in FIG. 2A, the job ticket 40 contains print setting information A which is associated with a page group including Pages 1 to 3, print setting information B which is associated with a page group including Pages 4 to 6, and print setting information C which is associated with a page group including Pages 7 to 9.

The PDF analysis part 121 in the job analysis section 12 obtains, with reference to the trailer, the position information in the cross-reference table. Then, the PDF analysis part 121 refers to the position information of the objects in the PDF file 30 and information in the metadata by using the cross-reference table, to thereby analyze data of each page. In this manner, the PDF file 30 is analyzed. Further, the job ticket analysis part 122 of the job analysis section 12 analyzes the print attribute information contained in the job ticket 40. In this manner, the job ticket 40 is analyzed.

Further, the job dividing unit determination section 13 determines, based on the print attribute information of the print job, a dividing unit for the print job. The print attribute information includes, for example, the metadata and the print setting information contained in the job ticket 40. In this example, the job dividing unit determination section 13 determines three page groups, namely, a page group including Pages 1 to 3, a page group including Pages 4 to 6, and a page group including Pages 7 to 9, as the dividing units. The PDF generation part 141 of the job generation section 14 divides the PDF file 30 into groups according to the dividing units thus determined, to thereby generate PDF files associated with, for example, the three page groups, namely, the page group including Pages 1 to 3, the page group including Pages 4 to 6, and the page group including Pages 7 to 9. Further, the job ticket generation part 142 of the job generation section 14 generates job tickets associated with the PDF files generated by the PDF generation part 141. In the manner as described above, the print job illustrated in FIG. 2A is divided into print jobs each including the PDF file and the job ticket associated with the PDF file, which are generated as described above.

Figure 2B:
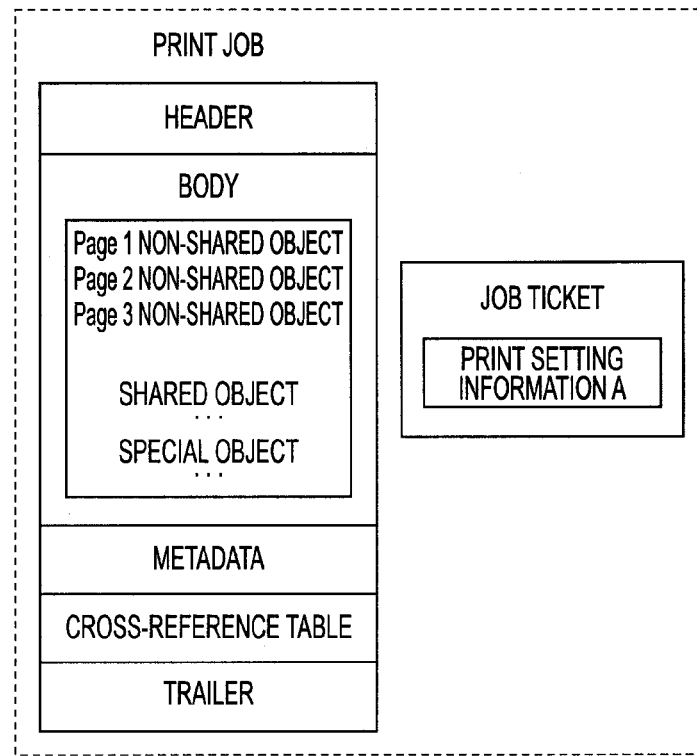
FIG. 2B is a diagram illustrating an example of a PDF file and a job ticket.
Figure 2C:
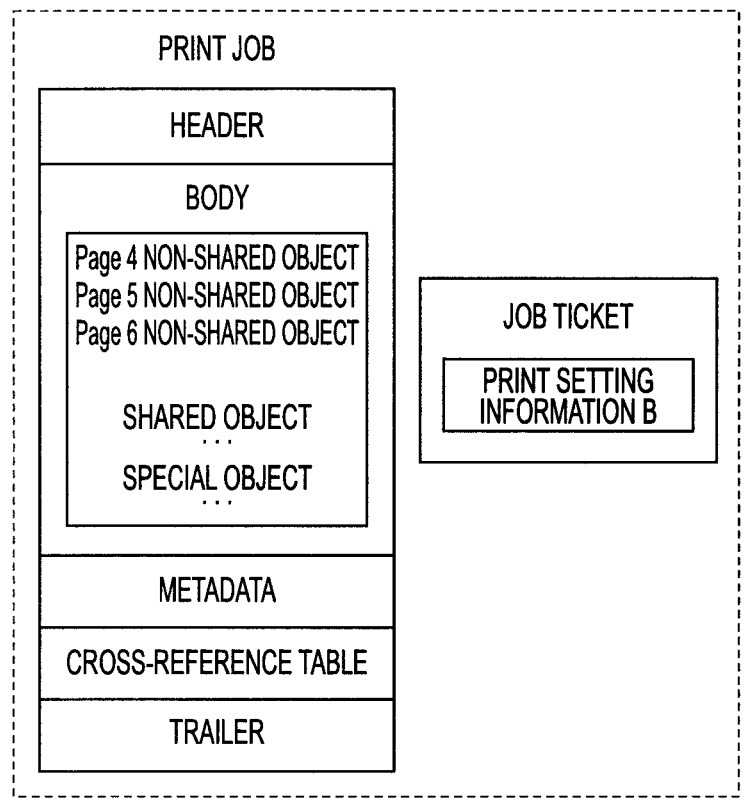
FIG. 2C is a diagram illustrating an example of a PDF file and a job ticket.
Figure 2D:
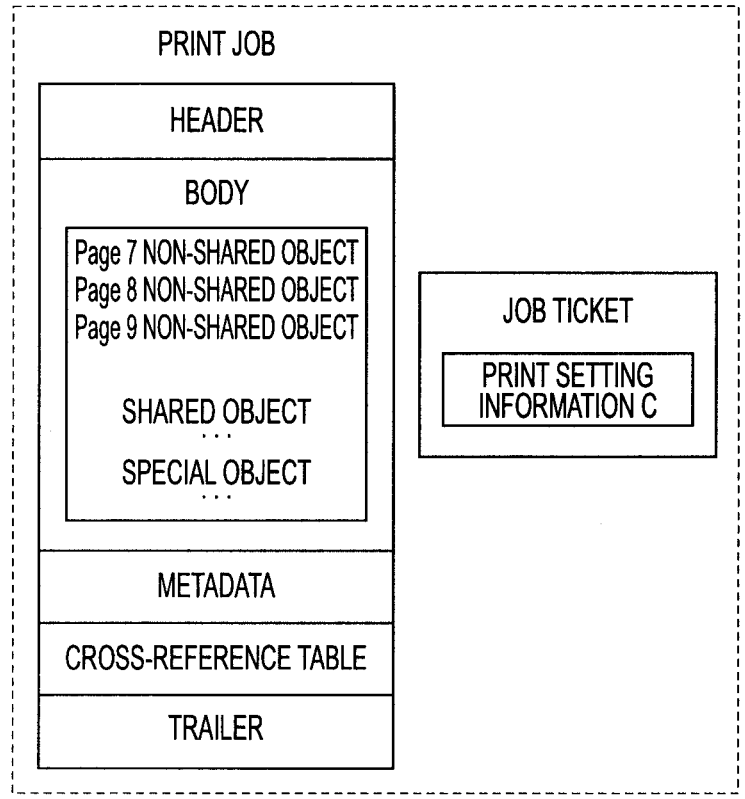
FIG. 2D is a diagram illustrating an example of a PDF file and a job ticket.

FIGS. 2B to 2D each illustrate a print job obtained by dividing the print job illustrated in FIG. 2A. FIG. 2B illustrates a print job associated with the page group including Pages 1 to 3, FIG. 2C illustrates a print job associated with the page group including Pages 4 to 6, and FIG. 2D illustrates a print job associated with the page group including Pages 7 to 9.

Figure 3:
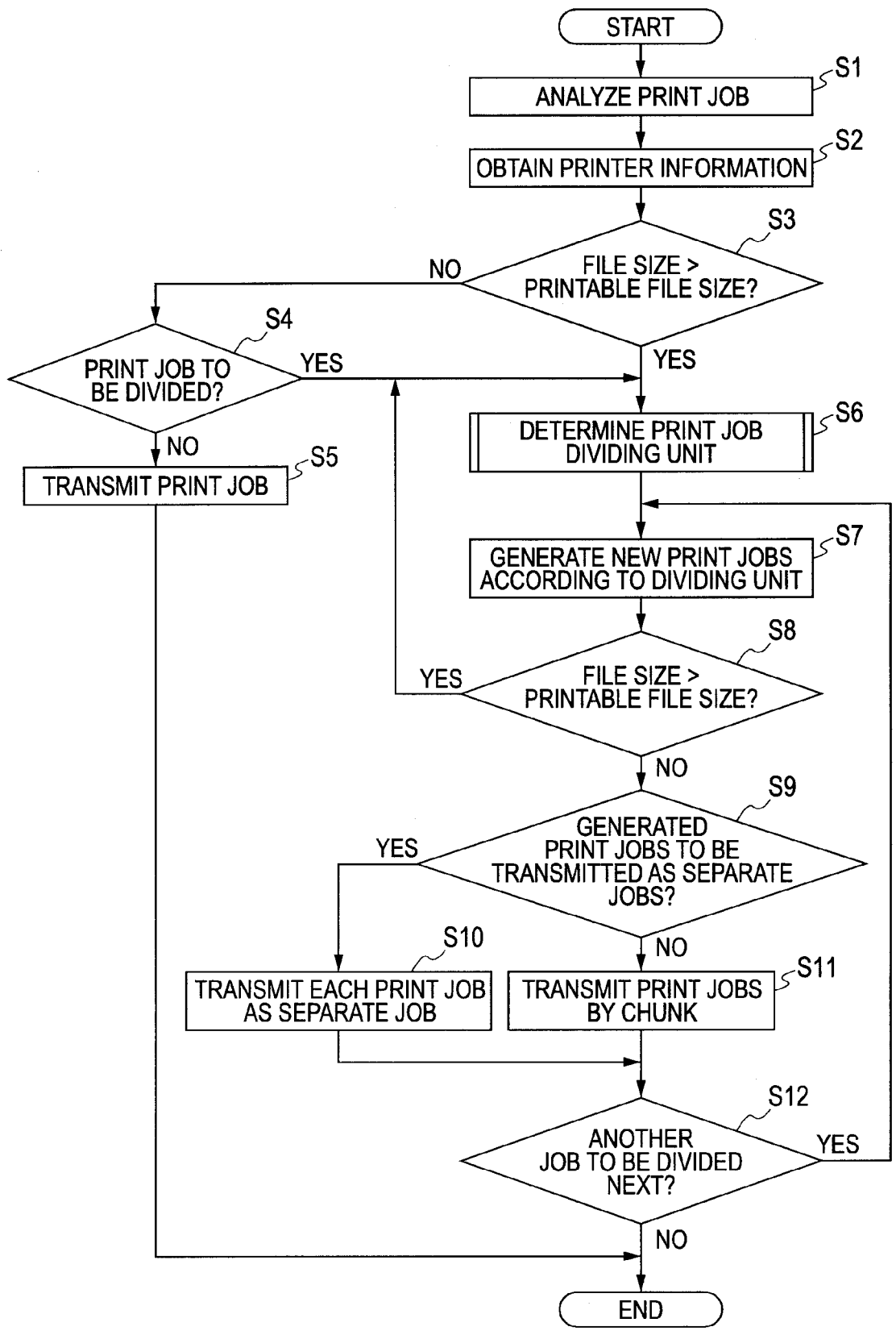
FIG. 3 is a flow chart illustrating an example of a process flow of an operation of an information processing apparatus according to the embodiment.

FIG. 3 is a flow chart illustrating an example of a process flow of an operation of the information processing apparatus 1 according to the embodiment. The job analysis section 12 analyzes a print job (Step S1), and stores a result of the analysis as job data in the job data storage section 16. Next, the job dividing unit determination section 13 obtains, via the printer I/F 15, the printer information on the printer from the printer 2 (Step S2). The printer information obtained in Step S2 contains information on a maximum file size to be processed and printed by the printer 2. Subsequently, the job dividing unit determination section 13 determines whether the file size of the print job exceeds the maximum file size to be processed and printed by the printer 2 obtained in Step S2 (Step S3). In a case where the job dividing unit determination section 13 determines that the file size of the print job does not exceed the maximum file size to be processed and printed by the printer 2, the process proceeds to Step S4. In a case where the job dividing unit determination section 13 determines that the file size of the print job exceeds the maximum file size to be processed and printed by the printer 2, the process proceeds to Step S6.

In Step S4, the job dividing unit determination section 13 determines, according to an operation input made by the user via the keyboard controller 29 (see FIG. 1B), whether or not to divide the print job. The job dividing unit determination section 13 may determine whether or not to divide the print job, based on a predetermined setting as to whether or not to divide the print job. When the job dividing unit determination section 13 determines to divide the print job, the process proceeds to Step S6. When the job dividing unit determination section 13 determines not to divide the print job, the printer I/F 15 transmits the print job to the printer 2 (Step S5).

In Step S6, the job dividing unit determination section 13 determines a dividing unit for the print job. Then, the job generation section 14 divides the print job into groups according to the dividing units for the print job, to thereby generate divided print jobs which are new print jobs according to the dividing units (Step S7). In this case, a cross-reference table for the new print jobs after the division is derived. Specifically, an offset value in the divided print job is determined for an object to be included in the divided print job, and the offset value is stored in the cross-reference table of the divided print job together with the information on the number of objects. The shared objects are copied from the print job before the division to the multiple print jobs after the division. The offset value for the shared object is also provided additionally to the cross-reference table of the divided print job. Subsequently, the printer I/F 15 determines whether or not the file size of the print job thus generated exceeds the maximum file size to be processed and printed by the printer 2 obtained in Step S2 (Step S8). When the printer I/F 15 determines that the file size of the print job thus generated exceeds the maximum file size to be processed and printed by the printer 2, the process returns to Step S6. When the printer I/F 15 determines that the file size of the print job thus generated does not exceed the maximum file size to be processed and printed by the printer 2, the process proceeds to Step S9.

In Step S9, the printer I/F 15 determines, according to an operation input made by the user, whether or not to transmit the divided print jobs thus generated, as separate jobs (Step S9). When the printer I/F 15 determines to transmit the divided print jobs as separate jobs, the printer I/F 15 transmits the divided print jobs as separate jobs (Step S10). When the divided print jobs are transmitted as separate jobs, an interrupt of another process is allowed during the transmission of the divided print jobs. When the printer I/F 15 determines not to transmit the divided print jobs as separate jobs, the printer I/F 15 packages the print jobs to transmit the print jobs as one job (chunk transmission) (Step S11). When the print jobs are transmitted in a chunk, an interrupt of another process during the transmission of the jobs may be prevented. Subsequently, the job generation section 14 determines whether there is another print job to be divided next (Step S12). When the job generation section 14 determines that there is another print job to be divided next, the process returns to Step S7 described above. When the job generation section 14 determines that there is no print job to be divided next, the process is ended.

Example of Print Job Dividing Unit Determination Process Flow: Finishing

Figure 4:
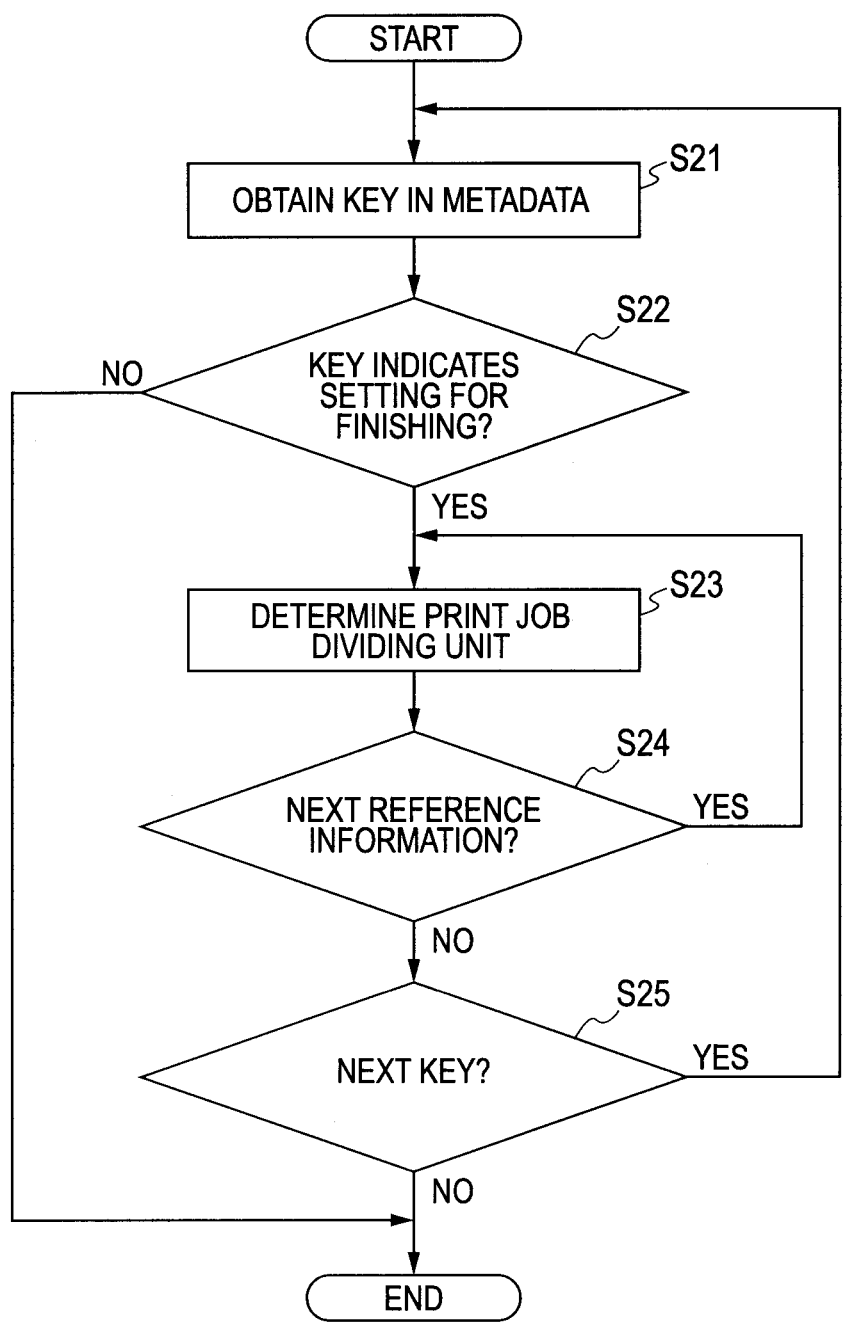
FIG. 4 is a flow chart illustrating an example of a process flow of determining a print job dividing unit.
Figure 5A:
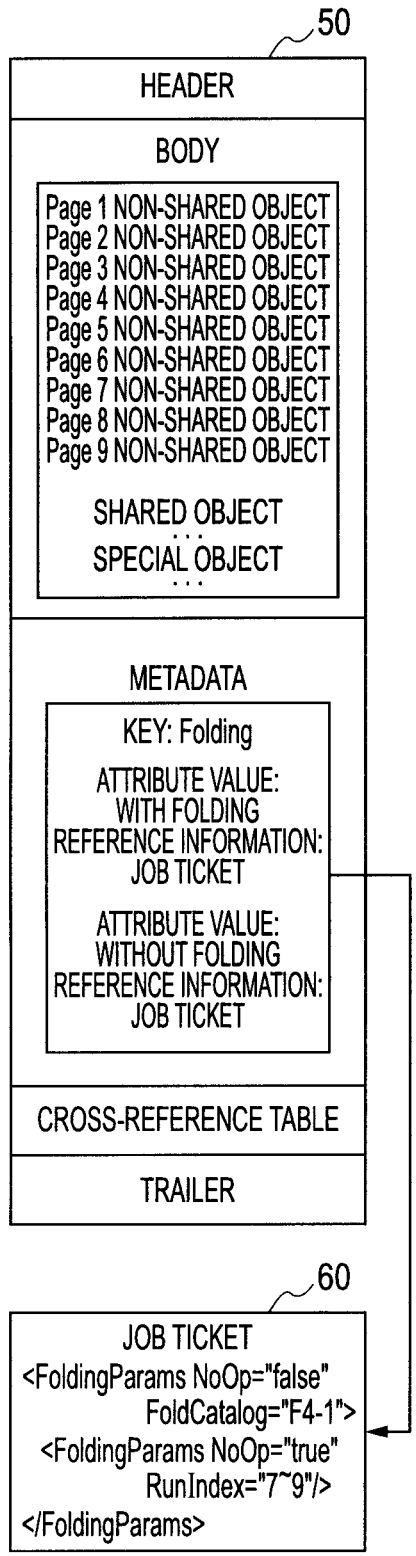
FIG. 5A is a diagram illustrating an example of a print job according to the process flow of FIG. 4.

FIG. 4 is a flow chart illustrating an example of a process flow of determining a print job dividing unit. The process flow illustrated in FIG. 4 illustrates the process of determining a dividing unit for a print job in Step S6 of FIG. 3. In this example, a print job indicated by the job data in the job data storage section 16 has a structure illustrated in FIG. 5A. The print job illustrated in FIG. 5A contains a PDF file 50 which has objects for nine pages set in the body thereof. Further, the key in the metadata of the PDF file 50 has "Folding" set thereto, as information indicating a setting for finishing. "Folding" indicates a process of folding a page. The metadata has one of the settings for folding (with folding, and without folding) set as an attribute value thereof, and job tickets set thereto as reference information associated with each of the settings for folding. Further, a job ticket 60 contained in the print job illustrated in FIG. 5A includes print setting information indicating print setting. According to the print setting, the folding process is performed from Page 1 to Page 6, while the folding process is not performed from Page 7 to Page 9. It should be noted that, in the example illustrated in FIG. 5A, the job ticket 60 is in a job definition format (JDF).

In Step S21 of FIG. 4, the job dividing unit determination section 13 extracts job data from the job data storage section 16, and obtains, from the job data thus extracted, the key in the metadata of the PDF file 50. Subsequently, the job dividing unit determination section 13 determines whether the key thus obtained indicates the setting for finishing (Step S22). When the job dividing unit determination section 13 determines that the key does not indicate the setting for finishing, the process is ended. When the job dividing unit determination section 13 determines that the key indicates the setting for finishing, the job dividing unit determination section 13 determines a dividing unit for the print job (Step S23). For example, the job dividing unit determination section 13 obtains the attribute value and the reference information set in the metadata of the PDF file 50 illustrated in FIG. 5A, and also obtains the print setting information in the job ticket 60 indicated by the reference information. Then, the job dividing unit determination section 13 determines, based on the attribute value and the print setting information, a unit of job data items each having the same type of setting for finishing, as a dividing unit for the print job. Specifically, the job dividing unit determination section 13 determines a page group including Page 1 to Page 6 which are to be subjected to the folding process, as one dividing unit. Next, the job dividing unit determination section 13 determines whether there is another reference information next. When the job dividing unit determination section 13 determines that there is another reference information next, the process returns to Step S23, where the job dividing unit determination section 13 determines a next dividing unit for the print job. As a result, for example, the page group including Page 7 to Page 9 which are not to be subjected to the folding process is determined as another dividing unit.

Figure 5B:
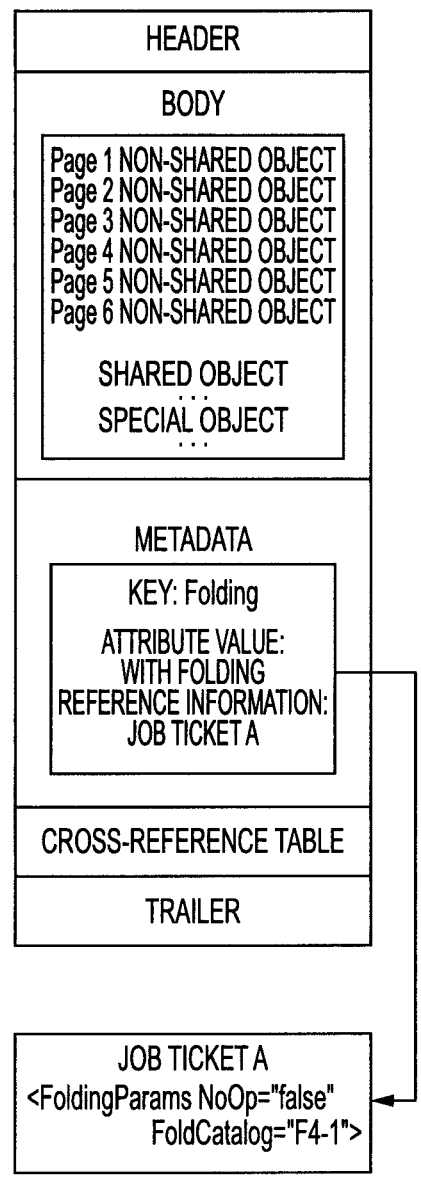
FIG. 5B is a diagram illustrating an example of a print job according to the process flow of FIG. 4.
Figure 5C:
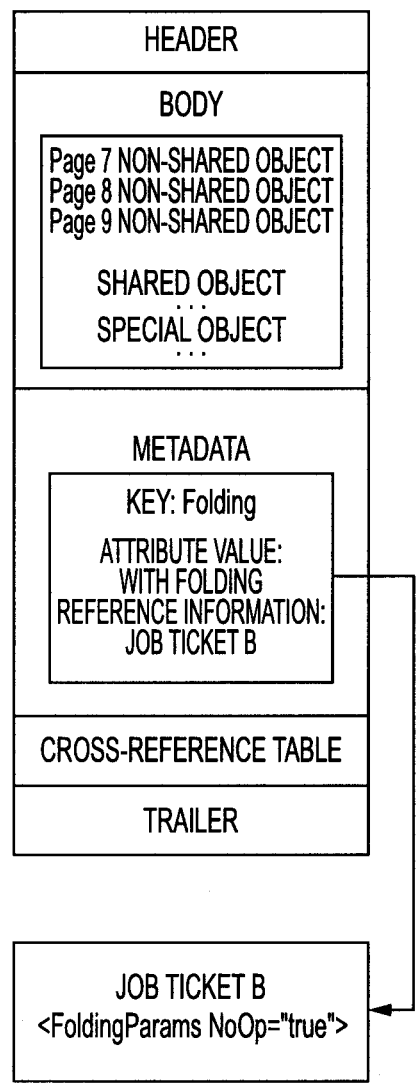
FIG. 5C is a diagram illustrating an example of a print job according to the process flow of FIG. 4.

When the job dividing unit determination section 13 determines that there is no reference information next, the job dividing unit determination section 13 determines whether there is another key next (Step S25). When the job dividing unit determination section 13 determines that there is another key next, the process returns to Step S21. When the job dividing unit determination section 13 determines that there is no key next, the process is ended. The job dividing unit determination section 13 determines a dividing unit for the print job illustrated in FIG. 5A according to the process flow illustrated in FIG. 4, so that the page group including Page 1 to Page 6 and the page group including Page 7 to Page 9 are determined as the dividing units. The job generation section 14 divides the print job into groups according to the dividing units, so that print jobs illustrated in, for example, FIGS. 5B and 5C are generated. The print job illustrated in FIG. 5B includes a PDF file associated with the page group including Page 1 to Page 6 and a job ticket A. Meanwhile, the print job illustrated in FIG. 5C includes a PDF file associated with the page group including Page 7 to Page 9 and a job ticket B.

According to the process flow of FIG. 4, in the information processing apparatus 1, the print job may be divided in units of page groups each having the same type of setting for finishing set thereto, and a PDF file may be generated one by one for each page group having the same type of setting for finishing set thereto. For example, when Page 1 and Page 5 each have the setting of folding while Page 2 to Page 4 have another setting for finishing, there may be generated one PDF file associated with Page 1 and Page 5 which have the setting of folding. As a result, the printing process in the printer 2 may be executed in units of the same setting for finishing, which increases efficiency in printing.

As another example, as the print attribute, print mode such as color mode or monochrome mode, medium type, paper size may also be taken into consideration. In other words, even in a case where the print attribute is changed in the middle of the print job yet to be divided, the printer 2 may be efficiently operated. Further, there may be a case where the print medium type (such as heavy paper, high-quality paper, or plain paper), the paper size, or the print mode (such as color mode or monochrome mode) is changed in the middle of the job. When various print attributes are changed in the middle of the print job as described above, a print engine may need to perform switching process. In such a case, as in this example, the job is divided in units of print attributes which are different from one another, and transmitted by the transmission side, to thereby improve performance. For example, of the divided jobs, a first divided job which has a first print attribute set thereto is received and the printing is ended, and then only a second print attribute of a second divided job is received in advance so that a process of switching the setting may be performed. During the switching process, though the print engine cannot perform the print process, a divided print job which has the second print attribute set thereto is received. In this manner, the switching process of the print engine and the receiving process of the divided job are performed simultaneously with each other, to thereby increase performance of the entire system. Further, the information processing apparatus 1 transmits each of the divided print jobs in a separate file to the printer 2, and hence the printer may analyze each of the divided print jobs and perform a print process thereon one by one each time the divided print job is received. As a result, the process of transmitting the print job from the information processing apparatus 1 and the print process in the printer 2 may be performed in parallel with each other.

Example of Print Job Dividing Unit Determination Process Flow: Print Media

Figure 7A:
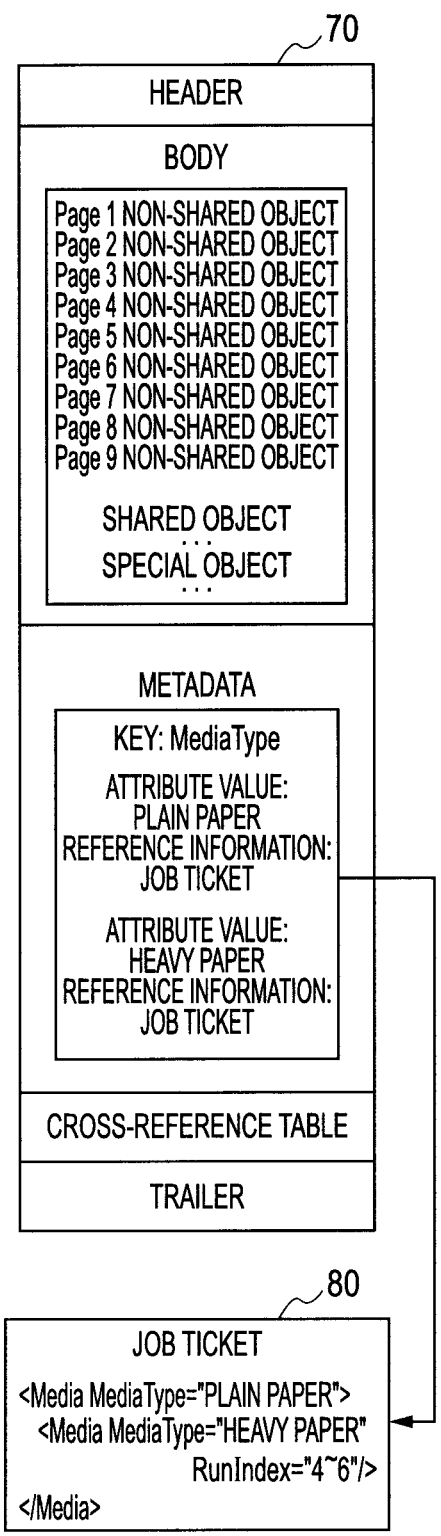
FIG. 7A is a diagram illustrating an example of a print job according to the process flow of FIG. 6.

FIG. 6 is a flow chart illustrating another example of the process flow of determining a print job dividing unit. In the process illustrated in FIG. 6, Steps S31, S33, S34, and S35 are similar to Steps S21, S23, S24, and S25 illustrated in FIG. 4, and hence the detailed description thereof is omitted. In this example, a print job indicated by the job data in the job data storage section 16 has a structure as illustrated in FIG. 7A. The key in the metadata of a PDF file 70 contained in the print job illustrated in FIG. 7A has "Media Type" set thereto. "Media Type" indicates a print medium to be used. The metadata has the types of print media such as plain paper and heavy paper set as the attribute values thereof, and a job ticket is set thereto as reference information associated with the settings of the types of print media. According to the setting in a job ticket 80 contained in the print job illustrated in FIG. 7A, plain paper is used for Page 1 to Page 3 and Page 7 to Page 9, while heavy paper is used for Page 4 to Page 6.

In Step S32 of FIG. 6, the job dividing unit determination section 13 determines whether or not the obtained key indicates the setting for print media. When the job dividing unit determination section 13 determines that the key does not indicate the setting for print media, the process is ended. When the job dividing unit determination section 13 determines that the key indicates the setting for print media, the job dividing unit determination section 13 determines a dividing unit for the print job (Step S33). For example, the job dividing unit determination section 13 obtains the attribute value and the reference information set in the metadata of the PDF file 70 illustrated in FIG. 7A, and also obtains the print setting information in the job ticket 80 indicated by the reference information. Then, the job dividing unit determination section 13 determines, based on the attribute value and the print setting information, a unit of job data items each having the same type of setting for print media, as a dividing unit for the print job. Specifically, the job dividing unit determination section 13 determines a page group including Page 1 to Page 3 and Page 7 to Page 9 which are associated with the setting of using plain paper, as one dividing unit for the print job. Further, the job dividing unit determination section 13 determines a page group including Page 4 to Page 6 which is associated with the setting of using heavy paper, as another dividing unit for the print job.

Figure 7B:
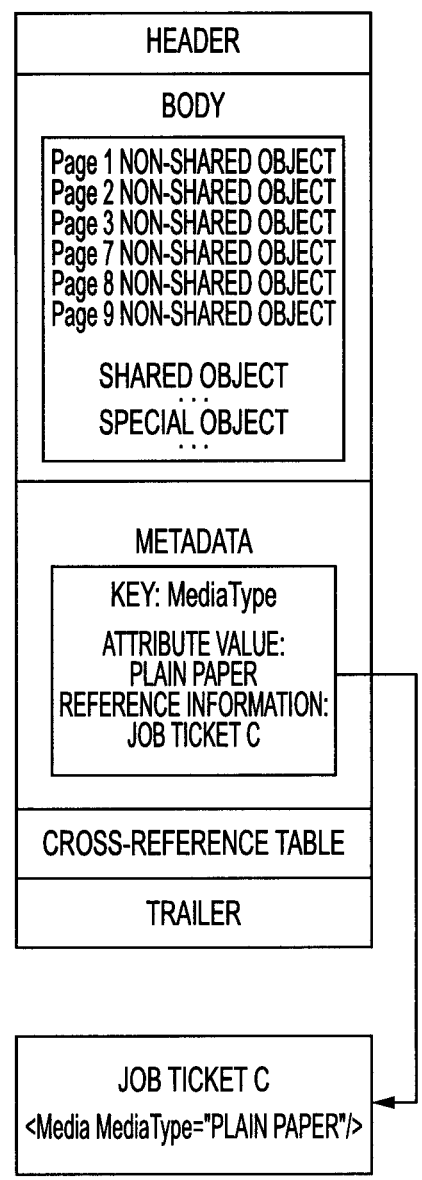
FIG. 7B is a diagram illustrating an example of a print job according to the process flow of FIG. 6.
Figure 7C:
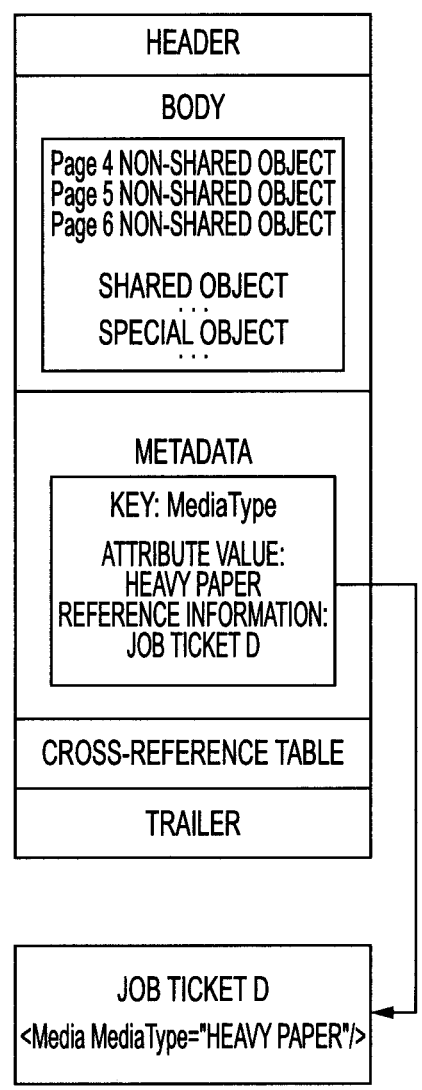
FIG. 7C is a diagram illustrating an example of a print job according to the process flow of FIG. 6.

The job generation section 14 divides the print job into groups according to the dividing units determined as described above, to thereby generate, for example, print jobs illustrated in FIGS. 7B and 7C. The print job illustrated in FIG. 7B includes a PDF file associated with the page group including Page 1 to Page 3 and Page 7 to Page 9, and a job ticket C. Further, the print job illustrated in FIG. 7C includes a PDF file associated with the page group including Page 7 to Page 9, and a job ticket D. According to the process flow of FIG. 6, in the information processing apparatus 1, the print job may be divided in units of page groups each having the same type of setting for print media set thereto, and a PDF file may be generated one by one for each page group having the same type of setting for print media set thereto. As a result, for example, the print process in the printer 2 may be performed in units of the same setting for paper to be used, which reduces downtime occurring when changing the print paper.

Example of Print Job Dividing Unit Determination Process Flow: Record

FIG. 8 is a flow chart illustrating a further example of the process flow of determining a print job dividing unit. In this example, the job dividing unit determination section 13 determines, based on information on record indicated by the key in the metadata of the PDF file, a unit of each record as a dividing unit for the print job. In this example, information on attributes of the record is stored in advance in a record database, which is a predetermined storage section provided to the information processing apparatus 1.

Figure 9A:
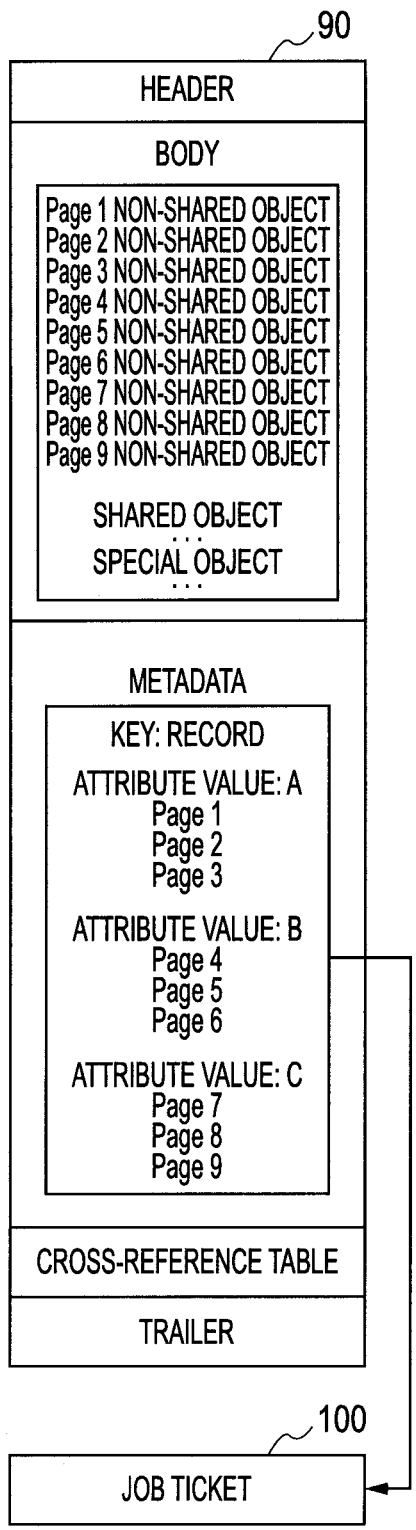
FIG. 9A is a diagram illustrating an example of a print job according to the process flow of FIG. 8.

In this example, the print job indicated by the job data in the job data storage section 16 has a structure illustrated in FIG. 9A. The key in metadata of a PDF file 90 contained in the print job illustrated in FIG. 9A has "Record" set thereto. "Record" indicates a predetermined printing unit of data contained in the PDF file 90. For example, when the printing system performs variable print on a customer-by-customer basis, the "Record" indicates a printing unit of the variable data for one customer. The metadata has records associated with customers set thereto, as attributes of the "Record", and pages associated with the attributes of the "Record" set thereto, as the reference information associated with the attribute of each record. In the example illustrated in FIG. 9A, Page 1 to Page 3, Page 4 to Page 6, and Page 7 to Page 9 are set as pages associated with the attributes of Record A, Record B, and Record C, respectively. It should be noted that, in this example, a job ticket 100 contains predetermined print setting information to be shared by each attribute.

In Step S41 of FIG. 8, the job dividing unit determination section 13 extracts job data from the job data storage section 16, and obtains, from the job data thus extracted, the key in the metadata of the PDF file 90. Subsequently, the job dividing unit determination section 13 determines whether the key thus obtained indicates the information on record (Step S42). When the job dividing unit determination section 13 determines that the key thus obtained does not indicate information on record, the process is ended. When the job dividing unit determination section 13 determines that the key indicates information on record, the job dividing unit determination section 13 searches the record database (Step S43), to thereby determine whether the record database includes the attribute of the record in the metadata (Step S44). When the job dividing unit determination section 13 determines that the record database does not include the attribute of the record in the metadata, the process is ended. When the job dividing unit determination section 13 determines that the record database includes the attribute of the record in the metadata, the job dividing unit determination section 13 identifies a page group associated with the attribute of the record, based on the reference information associated with the attribute of the record, and determines the page group thus identified, as a dividing unit for the print job (Step S45). Subsequently, the job dividing unit determination section 13 determines whether there is another attribute next. When the job dividing unit determination section 13 determines that there is no attribute next, the process is ended. When the job dividing unit determination section 13 determines that there is another attribute next, the process returns to Step S45, where the job dividing unit determination section 13 determines another dividing unit for the print job.

Figure 9B:
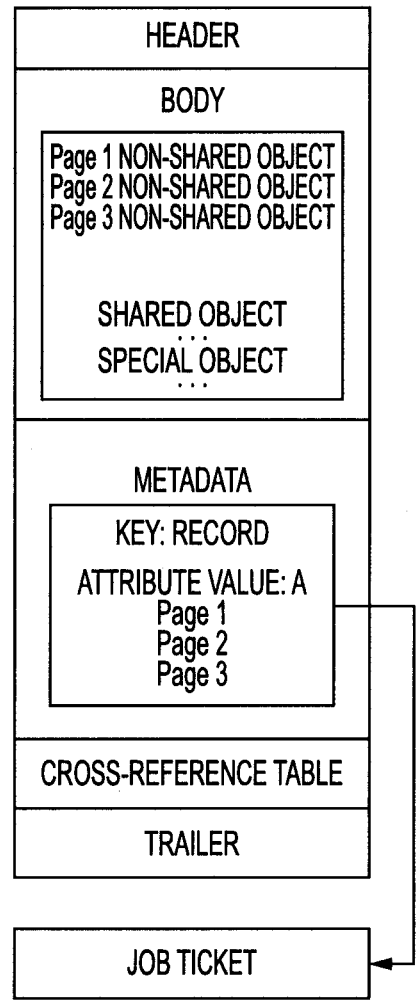
FIG. 9B is a diagram illustrating an example of a print job according to the process flow of FIG. 8.

The job dividing unit determination section 13 determines a dividing unit for the print job illustrated in FIG. 9A according to the process flow illustrated in FIG. 8, so that the page group including Page 1 to Page 3, the page group including Page 4 to Page 6, and the page group including Page 7 to Page 9 are determined as the dividing units. The job generation section 14 divides the print job into groups according to the dividing units, so that print jobs illustrated in, for example, FIGS. 9B to 9D are generated.

According to the process flow of FIG. 8, in the information processing apparatus 1, the print job may be divided in units of page groups each associated with a record having the same attribute, and a PDF file may be generated one by one for each page group associated with a record having the same attribute. As a result, for example, a process of recovery after a paper jam or a process of suspending a job, which are performed during printing, may be performed in units of records with the same attributes.

In the above, the information processing apparatus for processing a print job which contains objects to be laid out on a page is described. The print job has a cross-reference table defined at the end thereof, which is an example of position information on the objects in the print job. Here, the information processing apparatus includes a computer function as illustrated in FIG. 1A. As illustrated in FIGS. 1A and 1B, the information processing apparatus may be a work station having a printer controller function, and may be a work station to be connected to a print engine. Alternatively, the information processing apparatus may include the information processing apparatus 1 and the printer 2 which are integrally formed. In other words, the information processing apparatus may be a printing device having an image processing function, having a print engine incorporated thereinto. Here, the end of the print job refers to a latter half of the print job starting from a predetermined address, and not limited to the rearmost end. Then, the job dividing unit determination section 13 determines the print job dividing unit, based on the print attribute information contained in the print job, as described above.

Further, based on the dividing unit thus determined, position information on the objects is derived, and multiple divided print jobs, each including the position information thus derived, are generated as described above. For example, the divided print jobs are each illustrated in FIGS. 2B, 2C, and 2D, respectively.

Further, the printer I/F 15 transmits the print jobs thus generated to the printer 2 as described above. The printer I/F 15 is an example of a job transmission section.

Other Embodiment

Further, the present invention may be implemented by performing the following processing. Specifically, software (programs) for implementing the functions of the above-mentioned examples is supplied to a system or an apparatus via a network or via various storage media, and a computer (or another device such as a CPU or a micro processing unit (MPU)) in the system or in the apparatus reads out the programs to execute the processing. In this case, the programs and the storage media storing the programs are incorporated into the present invention.

While the present invention has been described with reference to an exemplary embodiment, it is to be understood that the invention is not limited to the disclosed exemplary embodiment. It will be understood that various modifications and applications may be made thereto, and it is intended that the appended claims cover all such modifications and applications as fall within the scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-184119, filed on Aug. 7, 2009, which is hereby incorporated by reference herein in its entirety.

The invention claimed is:

1. An information processing apparatus for processing a print job which includes electronic document data containing a shared object to be used wholly in the print job, a non-shared object to be used in part of the print job, and position information on each object, and a job ticket indicating print setting information associated with the electronic document data, the information processing apparatus comprising:
 a determination unit configured to determine a dividing unit for the electronic document data, wherein, when a key included in metadata of the electronic document data indicates information on a record for variable printing, the determination unit (a) searches a record database for the record in the metadata of the electronic document data, (b) based on reference information corresponding to an attribute of a found record, identifies a page group corresponding to the attribute of the found record, and (c) determines the identified page group as the dividing unit;
 a generation unit configured to generate, according to the dividing unit determined by the determination unit, multiple electronic document data items each containing the shared object and the non-shared object associated with the dividing unit, but not including non-shared object unassociated with the dividing unit; and
 a transmission unit configured to sequentially transmit the divided multiple electronic document data items generated by the generation unit, to a printer.

2. An information processing apparatus according to claim 1, wherein the determination unit determines, based on information on setting for finishing as the print attribute information and on the print setting information associated with the setting for finishing, electronic document data items having the same setting for finishing set thereto, as one dividing unit.

3. An information processing apparatus according to claim 1, wherein the determination unit determines, based on information on a print medium onto which the print job is to be printed, as the print attribute information, and on the print setting information associated with the print medium onto which the print job is to be printed, electronic document data items to be printed on the same print medium, as one dividing unit.

4. An information processing apparatus according to claim 1, further comprising:
 an obtaining unit configured to obtain information from the printer; and
 a division determination unit configured to determine, based on the information on the printer obtained by the obtaining unit, whether or not to divide the electronic document data,
 wherein when the division determination unit determines to divide the electronic document data, the generation unit divides the electronic document data to generate the multiple electronic document data items.

5. An information processing apparatus according to claim 4, wherein the information on the printer is information on a maximum amount of information to be processed and printed by the printer, and wherein the division determination unit determines whether an amount of information of the electronic document data exceeds the maximum amount of information to be processed and printed by the printer, and the division determination unit determines to divide the print job when the division determination unit determines that the amount of information of the print job exceeds the maximum amount of information to be processed and printed.

6. An information processing apparatus for processing electronic document data which contains multiple objects and position information on the multiple objects, the multiple objects being configured to be in a structure which is interpretable only when the data is referred to thoroughly to the end, the information processing apparatus comprising:
 a determination unit configured to determine a dividing unit for the electronic document data, wherein, when a key included in metadata of the electronic document data indicates information on a record for variable printing, the determination unit (a) searches a record database for the record in the metadata of the electronic document data, (b) based on reference information corresponding to an attribute of a found record, identifies a page group corresponding to the attribute of the record, and (c) determines the identified page group as the dividing unit;
 a generation unit configured to generate, according to the dividing unit determined by the determination unit, multiple electronic document data items each containing an object associated with the dividing unit and position information on the object; and
 a transmission unit configure to sequentially transmit the divided multiple electronic document data items generated by the generation unit, to a printer.

7. An information processing apparatus according to claim 6, wherein the determination unit determines, based on information on setting for finishing as the print attribute information and on print setting information associated with the setting for finishing, electronic document data items having the same setting for finishing set thereto, as one dividing unit.

8. An information processing apparatus according to claim 6, wherein the determination unit determines, based on information on a print medium onto which the print job is to be printed, as the print attribute information, and on print setting information associated with the print medium onto which the print job is to be printed, electronic document data items to be printed on the same print medium, as one dividing unit.

9. A control method for an information processing apparatus for processing a print job which includes electronic document data containing a shared object to be used wholly in the print job, a non-shared object to be used in part of the print job, and position information on each object, and a job ticket indicating print setting information associated with the electronic document data, the control method comprising:
   determining a dividing unit for the electronic document data, wherein, when a key included in metadata of the electronic document data indicates information on a record for variable printing, the determining step (a) searches a record database for the record in the metadata of the electronic document data, (b) based on reference information corresponding to an attribute of a found record, identifies a page group corresponding to the attribute of the record, and (c) determines the identified page group as the dividing unit;
   generating, according to the determined dividing unit, multiple electronic document data items each containing the shared object and the non-shared object associated with the dividing unit, but not including non-shared object unassociated with the dividing unit; and
   sequentially transmitting the generated divided multiple electronic document data items to a printer.

10. A control method according to claim 9, wherein the determining step determines, based on information on setting for finishing as the print attribute information and on the print setting information associated with the setting for finishing, electronic document data items having the same setting for finishing set thereto, as one dividing unit.

11. A control method according to claim 9, wherein the determining step determines, based on information on a print medium onto which the print job is to be printed, as the print attribute information, and on the print setting information associated with the print medium onto which the print job is to be printed, electronic document data items to be printed on the same print medium, as one dividing unit.

12. A control method according to claim 9, further comprising:
   obtaining information from the printer; and
   determining, based on the obtained information, whether or not to divide the electronic document data,
   wherein when the division determining step determines to divide the electronic document data, the generating step divides the electronic document data to generate the multiple electronic document data items.

13. A control method according to claim 12, wherein the information on the printer is information on a maximum amount of information to be processed and printed by the printer, and
   wherein the division determining step determines whether an amount of information of the electronic document data exceeds the maximum amount of information to be processed and printed by the printer, and the division determining step determines to divide the print job when the division determining step determines that the amount of information of the print job exceeds the maximum amount of information to be processed and printed.

14. A control method for an information processing apparatus for processing electronic document data which contains multiple objects and position information on the multiple objects, the multiple objects being configured to be in a structure which is interpretable only when the data is referred to thoroughly to the end, the control method comprising:
   determining a dividing unit for the electronic document data, wherein, when a key included in metadata of the electronic document data indicates information on a record for variable printing, the determining step (a) searches a record database for the record in the metadata of the electronic document data, (b) based on reference information corresponding to an attribute of a found record, identifies a page group corresponding to the attribute of the record, and (c) determines the identified page group as the dividing unit;
   generating, according to the determined dividing unit, multiple electronic document data items each containing an object associated with the dividing unit and position information on the object; and
   sequentially transmitting the generated divided multiple electronic document data items to a printer.

15. A control method according to claim 14, wherein the determining step determines, based on information on setting for finishing as the print attribute information and on print setting information associated with the setting for finishing, electronic document data items having the same setting for finishing set thereto, as one dividing unit.

16. A control method according to claim 14, wherein the determining step determines, based on information on a print medium onto which the print job is to be printed, as the print attribute information, and on print setting information associated with the print medium onto which the print job is to be printed, electronic document data items to be printed on the same print medium, as one dividing unit.

17. A non-transitory computer-readable storage medium on which is stored computer executable code of a program which causes a computer to execute the control method according to claim 9.

18. A non-transitory computer-readable storage medium on which is stored computer executable code of a program which causes a computer to execute the control method according to claim 14.

* * * * *